United States Patent
Wang et al.

(10) Patent No.: US 12,510,588 B2
(45) Date of Patent: Dec. 30, 2025

(54) VARIABLE TEMPERATURE TEST SYSTEM FOR PROVIDING DIFFERENT TEST ENVIRONMENTS AND OPERATION METHOD THEREOF

(71) Applicant: Hefei Core Storage Electronic Limited, Anhui (CN)

(72) Inventors: Chih-Ling Wang, Anhui (CN); Qi-Ao Zhu, Anhui (CN); Dong Sheng Rao, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 168 days.

(21) Appl. No.: 18/518,599

(22) Filed: Nov. 24, 2023

(65) Prior Publication Data

US 2025/0123322 A1    Apr. 17, 2025

(30) Foreign Application Priority Data

Oct. 11, 2023  (CN) .......................... 202311320443.4

(51) Int. Cl.
*G01R 31/28* (2006.01)
(52) U.S. Cl.
CPC .................. *G01R 31/2874* (2013.01)
(58) Field of Classification Search
CPC .. G06F 2119/02; G01K 3/04; G01K 2217/00; G01R 31/2874; G01R 1/04; G01R 1/28;
(Continued)

(56) References Cited

U.S. PATENT DOCUMENTS 7,483,806 B1 * 1/2009 Arsovski ................. G06F 1/206
                                                            702/132
7,619,427 B2 * 11/2009 Ando ...................... G01R 31/2874
                                                            324/750.13
(Continued)

FOREIGN PATENT DOCUMENTS

TW      200846683      12/2008
TW      201024738       7/2010
(Continued)

OTHER PUBLICATIONS

"Office Action of Taiwan Counterpart Application", issued on May 29, 2024, pp. 1-11.
(Continued)

Primary Examiner — Vinh P Nguyen
(74) Attorney, Agent, or Firm — JCIPRNET

(57) ABSTRACT

A variable temperature test system and an operation method thereof are provided. The variable temperature test system includes a main control device, multiple test devices, and a variable temperature test platform. The variable temperature test platform is coupled to the main control device and the test devices. The main control device provides an adjustment parameter according to at least one pending test. The variable temperature test platform includes multiple test areas, multiple temperature sensors, and a temperature control module. The test areas are respectively coupled to the test devices. The temperature sensors are respectively disposed in the test areas. The temperature control module is coupled to the test areas. The temperature control module adjusts a temperature of at least one test area according to the adjustment parameter.

12 Claims, 3 Drawing Sheets

(58) Field of Classification Search
CPC .......................... G01R 31/00; G01R 31/2875; G01R 31/2877; G01R 35/00; G01R 35/005
See application file for complete search history.

(56) References Cited

U.S. PATENT DOCUMENTS

| | | | |
|---|---|---|---|
| 9,148,910 B1* | 9/2015 | Mimran | H05B 1/023 |
| 9,726,717 B2* | 8/2017 | Maulsby | G11C 29/06 |
| 11,719,741 B2* | 8/2023 | Takeuchi | G01R 1/0466 324/750.05 |
| 2009/0287362 A1* | 11/2009 | Maesaki | G11C 29/56016 365/201 |

FOREIGN PATENT DOCUMENTS

| | | |
|---|---|---|
| TW | 202202865 A | 1/2022 |
| WO | 2019219596 A1 | 11/2019 |

OTHER PUBLICATIONS

"Notice of Allowance of Taiwan Counterpart Application", issued on Oct. 7, 2025, pp. 1-6.

* cited by examiner

VARIABLE TEMPERATURE TEST SYSTEM FOR PROVIDING DIFFERENT TEST ENVIRONMENTS AND OPERATION METHOD THEREOF

CROSS-REFERENCE TO RELATED APPLICATION

This application claims the priority benefit of China application serial no. 202311320443.4, filed on Oct. 11, 2023. The entirety of the above-mentioned patent application is hereby incorporated by reference herein and made a part of this specification.

BACKGROUND

Technical Field

The disclosure relates to a test system, and in particular to a variable temperature test system and an operation method thereof.

Description of Related Art

Digital cameras, mobile phones, and MP3 players have grown rapidly in recent years, resulting in a rapid increase in consumer demand for storage media. Since rewriteable non-volatile memory modules (e.g., flash memory) have the characteristics of non-volatile data, power saving, small size, and no mechanical structure, the rewriteable non-volatile memory modules are very suitable for being built into various portable multimedia devices as exemplified above.

In order to ensure the stability of the rewritable non-volatile memory module, testers need to not only verify the reliability of the rewritable non-volatile memory module, but also conduct live tests that simulate actual applications. In other words, the testers need to simulate test temperatures in different environments to determine whether the rewritable non-volatile memory module can withstand temperature changes in the actual environment. In the conventional technology, when the testers test a component under test (for example, a rewritable non-volatile memory module), multiple test equipment under different temperature environments need to be used to conduct plug swap tests. However, using different test equipment will reduce the accuracy of the tests, prolong the test time, and spend more test costs.

SUMMARY

In view of this, the disclosure provides a variable temperature test system and an operation method thereof, which may provide different test environments according to test requirements of a pending test, so that the test environment matches temperature changes in actual applications, so as to improve the accuracy of the test.

An exemplary embodiment of the disclosure provides a variable temperature test system, including a main control device, multiple test devices, and a variable temperature test platform. The variable temperature test platform is coupled to the main control device and the test devices. The main control device provides an adjustment parameter according to at least one pending test. The variable temperature test platform includes multiple test areas, multiple temperature sensors, and a temperature control module. The test areas are respectively coupled to the test devices. The temperature sensors are respectively disposed in the test areas. The temperature control module is coupled to the test areas. The temperature control module controls a temperature of at least one test area according to the adjustment parameter.

In an exemplary embodiment of the disclosure, the adjustment parameter is used to indicate the at least one test area, at least one test temperature corresponding to the at least one test area, and at least one test time corresponding to the at least one test area.

In an exemplary embodiment of the disclosure, in response to the temperature of the at least one test area being adjusted, at least one temperature sensor respectively detects at least one current temperature of the at least one test area, and the variable temperature test platform respectively transmits the at least one current temperature to at least one corresponding test device.

In an exemplary embodiment of the disclosure, in response to receiving each the at least one current temperature, each of the test devices determines whether each of the at least one current temperature matches an expected temperature of each of the at least one pending test. In response to each of the at least one current temperature matching the expected temperature, each of the test devices conducts each of the at least one pending test on a component under test placed in each of the corresponding test areas.

In an exemplary embodiment of the disclosure, in response to each of the at least one current temperature not matching the expected temperature, each of the test devices displays a warning notification.

In an exemplary embodiment of the disclosure, the variable temperature test system further includes a mobile device. The mobile device receives a control signal from the main control device and moves the component under test according to the control signal.

In an exemplary embodiment of the disclosure, the variable temperature test platform further includes a heat insulation area. The heat insulation area is disposed between the test areas to insulate heat conduction between the test areas.

An exemplary embodiment of the disclosure provides an operation method of a variable temperature test system. The variable temperature test system includes a main control device, multiple test devices, and a variable temperature test platform. The variable temperature test platform includes multiple test areas, multiple temperature sensors, and a temperature control module. The operation method includes providing an adjustment parameter according to at least one pending test through the main control device; and controlling a temperature of at least one test area according to the adjustment parameter through the temperature control module.

Based on the above, the variable temperature test system and the operation method thereof of the disclosure may provide different test environments according to the test requirements of the pending test (that is, the temperature of the test area is adjusted according to the adjustment parameter through the temperature control module), so that the test environment matches the temperature changes in actual applications, thereby improving the accuracy of the test. In addition, the variable temperature test system of the disclosure may also provide multiple test environments with different temperatures, which can avoid the plug swap test in the conventional technology, thereby reducing the loss of the component under test and improving the accuracy of the test.

To make the aforementioned more comprehensible, several embodiments accompanied with drawings are described in detail as follows.

DESCRIPTION OF THE EMBODIMENTS

Figure 1:
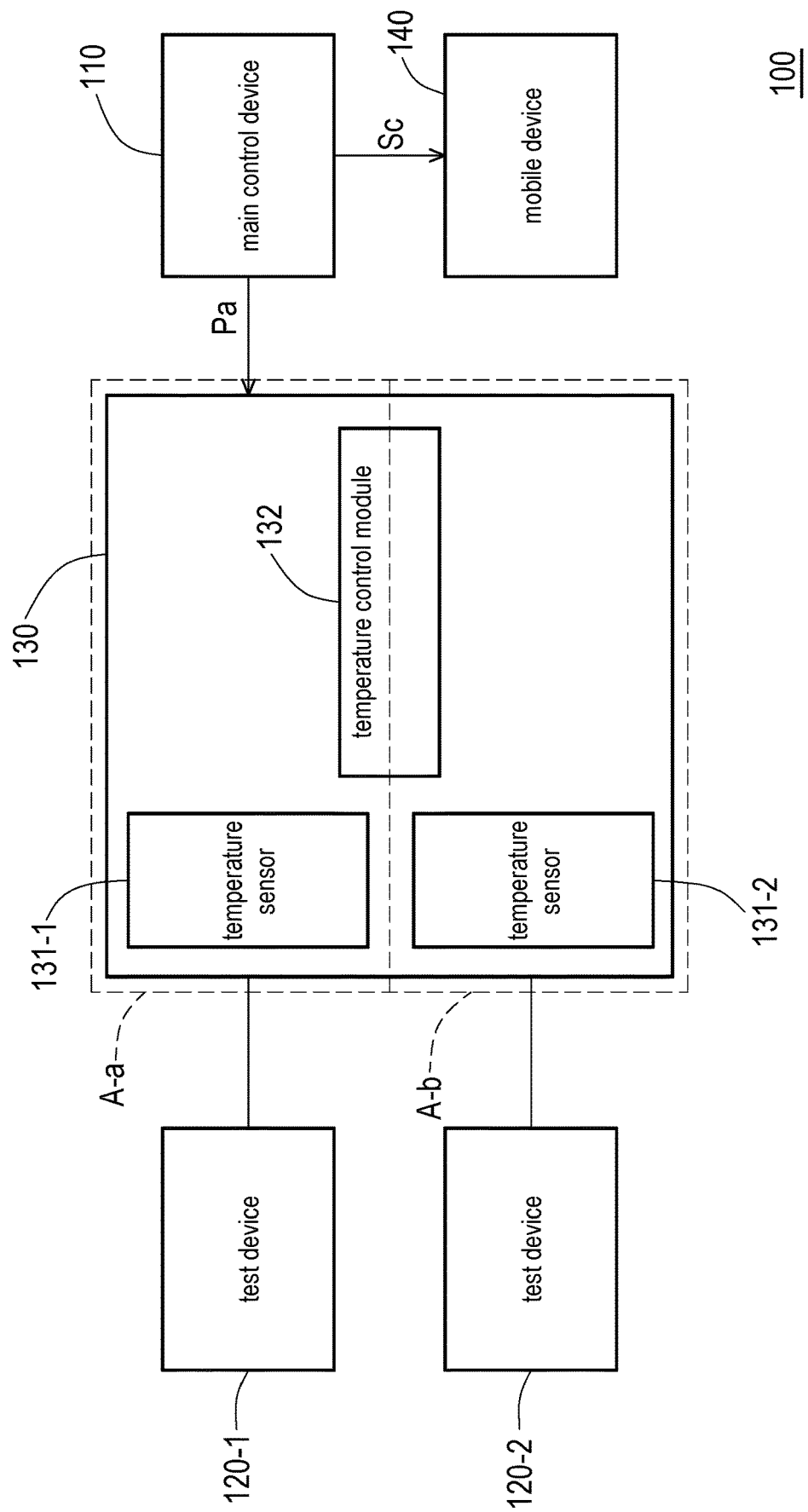
FIG. 1 is a schematic diagram of a variable temperature test system according to an exemplary embodiment of the disclosure.

Some embodiments of the disclosure will be described in detail in conjunction with the accompanying drawings. The referenced reference numerals in the following description will be regarded as the same or similar components when the same reference numerals appear in different drawings.

FIG. 1 is a schematic diagram of a variable temperature test system according to an exemplary embodiment of the disclosure.

Please refer to FIG. 1. A variable temperature test system 100 includes a main control device 110, test devices 120-1 and 120-2, and a variable temperature test platform 130.

The variable temperature test platform 130 is coupled to the main control device 110 and the test devices 120-1 and 120-2. The variable temperature test platform 130 includes test areas A-a and A-b, temperature sensors 131-1 and 131-2, and a temperature control module 132. The test areas A-a and A-b are respectively connected to the test devices 120-1 and 120-2. The temperature sensors 131-1 and 131-2 are respectively disposed in the test areas A-a and A-b, and are respectively used to detect temperatures of the test areas A-a and A-b. The temperature sensors 131-1 and 131-2 may be, for example, thermistors, thermocouples, or other sensors that may detect the temperature of the variable temperature test platform. The temperature control module 132 is coupled to the test areas A-a and A-b. The main control device 110 and the test devices 120-1 and 120-2 may be, for example, desktop computers, personal computers, and other equipment.

In this exemplary embodiment, a tester may provide an adjustment parameter Pa to the variable temperature test platform 130 through the main control device 110 according to a test requirement of a pending test. For example, when wanting to change the temperature of the test area A-a, the tester may provide the adjustment parameter Pa for indicating the test area A-a (that is, the test area with temperature to be changed), a test temperature corresponding to the test area A-a, and a test time corresponding to the test area A-a to the variable temperature test platform 130 through the main control device 110. Accordingly, the variable temperature test platform 130 may adjust the temperature of the test area A-a according to the adjustment parameter Pa through the temperature control module 132. Specifically, the temperature control module 132 may control the test area A-a to be at the test temperature during the test time to provide a temperature environment complying with the pending test.

Next, after the temperature of the test area A-a is adjusted to the test temperature, the temperature sensor 131-1 disposed in the test area A-a may detect a current temperature of the test area A-a, and the variable temperature test platform 130 then transmits the current temperature to the test device 120-1 connected to the test area A-a. When the test device 120-1 receives the current temperature, the test device 120-1 may determine whether the current temperature matches an expected temperature of the pending test. If the current temperature matches the expected temperature, the test device 120-1 may conduct the pending test on a component under test (not shown) placed in the corresponding test area A-a. In other words, after the temperature control module 132 adjusts the test area A-a to the test temperature complying with the pending test, the test device 120-1 may repeatedly verify the current temperature of the test area A-a to confirm that the temperature control module 132 has successfully adjusted the temperature of the test area A-a, thereby ensuring that the pending test is conducted under the correct temperature environment to improve the accuracy of the test.

On the other hand, if the current temperature does not match the expected temperature, the test device 120-1 may display a warning notification to remind the tester to check the temperature of the test environment again to improve the accuracy of the test.

In an exemplary embodiment, if the test requirement of the pending test is to first conduct the test for a period A under the environment with a temperature t1, and then conduct the test for a period B under the environment with a temperature t2, the tester may provide the adjustment parameter Pa to the variable temperature test platform 130 through the main control device 110 according to the test requirement and the test area with temperature to be changed (for example, the test area A-b). Accordingly, the temperature control module 132 in the variable temperature test platform 130 may adjust the test area A-b to the temperature t1 according to the adjustment parameter Pa. Then, the temperature sensor 131-2 may detect the current temperature of the test area Ab, and the variable temperature test platform 130 then transmits the current temperature to the test device 120-2 connected to the test area Ab. After the test device 120-2 receives the current temperature, the test device 120-2 may determine whether the current temperature matches the expected temperature (that is, the temperature t1) of the pending test. If the current temperature does not match the expected temperature, the test device 120-2 may display the warning notification to remind the tester to check the temperature of the test environment again.

If the current temperature matches the expected temperature, the test device 120-2 may conduct the pending test on a component under test (not shown) placed in the test area A-b. In addition, after the period A, the temperature control module 132 may adjust the test area A-b to the temperature t2, and repeat the above step to have the test device 120-2 repeatedly verify whether the current temperature of the test area A-a after the period A is the temperature t2. If the current temperature after the period A is the temperature t2, the test device 120-2 may continue to conduct the subsequent pending tests in the period B. If the current temperature after period A is not the temperature t2, the test device 120-2 does not conduct the subsequent pending tests and display the warning notification to remind the tester to check the temperature of the test environment again. In this way, the tester may dynamically adjust the temperature of the test area according to the test requirements of the pending test, which can avoid plug swap actions of multiple test equipment under different temperature environments during the test process in order to meet the test requirements, thereby reducing the loss of the component under test and improving the accuracy of the test.

In an exemplary embodiment, the variable temperature test system 100 may further include a mobile device 140. For example, when the tester wants to move the component under test (not shown) from the test area A-a to the test area A-b, the tester may send a control signal Sc to the mobile device 140 through the main control device 110. Accordingly, after receiving the control signal Sc, the mobile device 140 may move the component under test according to the control signal Sc, so that the tester may perform subsequent test operations. In addition, in this exemplary embodiment, the test area A-a may be, for example, a relatively high temperature area; and the test area A-b may be, for example, a relatively low temperature area. The variable temperature test platform 130 may provide the test environments with different temperatures at the same time to meet the requirements in actual applications.

Further, in order to meet the requirements in actual applications, the tester may first place the component under test in the relatively low temperature area (i.e., the test area A-b) for testing, and move the component under test to the relatively high temperature area (i.e., the test area A-a) through the mobile device 140 for subsequent tests after a period of time. In this way, the tester may complete the test of the component under test through the variable temperature test platform 130 under different temperature environments, which can avoid plug swap actions of multiple test equipment under different temperature environments during the test process in order to meet the test requirements, thereby reducing the loss of the component under test and improving the accuracy of the test.

Figure 2:
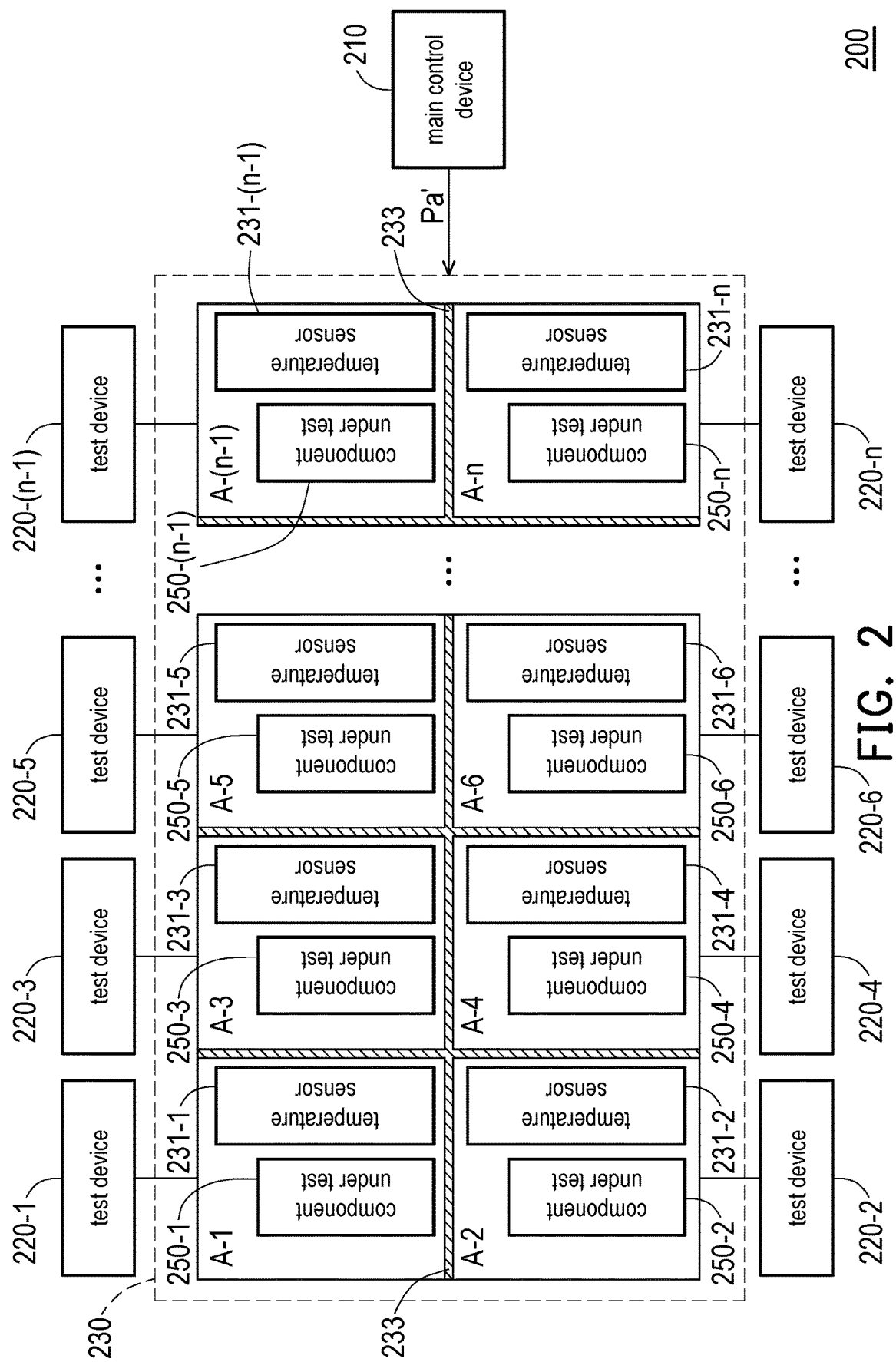
FIG. 2 is a schematic diagram of a variable temperature test system according to an exemplary embodiment of the disclosure.

FIG. 2 is a schematic diagram of a variable temperature test system according to an exemplary embodiment of the disclosure.

Please refer to FIG. 1 and FIG. 2 at the same time. A variable temperature test platform 200 includes a main control device 210, test devices 220-1 to 220-n, and a variable temperature test platform 230.

In this exemplary embodiment, in addition to the temperature control module 132 in FIG. 1, the variable temperature test platform 230 also includes test areas A-1 to A-n, temperature sensors 231-1 to 231-n, and a heat insulation area 233. The test devices 220-1 to 220-n are respectively connected to the corresponding test areas A-1 to A-n to respectively test components under test 250-1 to 250-n placed in the test areas A-1 to A-n. The temperature sensors 231-1 to 231-n are respectively disposed in the test areas A-1 to A-n to detect the temperatures of the test areas A-1 to A-n. The heat insulation area 233 is disposed between the test areas A-1 to An. The heat insulation area 233 may insulate heat conduction between the test areas A-1 to A-n, so as to avoid the temperature influence between the test areas A-1 to An. The number of the test devices 220-1 to 220-n, the test areas A-1 to A-n, the temperature sensors 231-1 to 231-n, and the components under test 250-1 to 250-n may be designed according to actual requirements (i.e., n may be any positive integer), which is not limited by the disclosure.

In an exemplary embodiment, the components under test 250-1 to 250-n may be, for example, memory storage devices having rewritable non-volatile memory modules. The temperatures of the test areas A-1 to A-n may, for example, fall between −60 degrees Celsius and 180 degrees Celsius.

In an exemplary embodiment, the tester wants to respectively conduct the same or different first pending test, second pending test, and third pending test on the component under test 250-3, the component under test 250-6, and the component under test 250-n that are respectively placed in the test area A-3, the test area A-6, and the test area A-n. The tester may provide an adjustment parameter Pa' to the variable temperature test platform 230 through the main control device 110 according to the test requirements of the first pending test, the second pending test, and the third pending test, so as to adjust the temperatures of the test areas A-3, A-6, and A-n.

Specifically, the adjustment parameter Pa' may be used to indicate the test areas with temperatures to be changed (i.e., the test areas A-3, A-6, and A-n), a first test temperature corresponding to the test area A-3, a first test time corresponding to the test area A-3, a second test temperature corresponding to the test area A-6, a second test time corresponding to the test area A-6, a third test temperature corresponding to the test area A-n, and a third test time corresponding to the test area A-n. Accordingly, the variable temperature test platform 230 may respectively adjust the temperatures of the test areas A-3, A-6, and A-n according to the adjustment parameter Pa' through the temperature control module 132. In detail, the temperature control module 132 may control the test area A-3 (the test area A-6, or the test area A-n) to be at the first test temperature (or the second test temperature, the third test temperature) during the first test time (the second test time, or the third test time) to provide the temperature environment complying with the first pending test (the second pending test, or the third pending test).

Next, after the temperature of the test area A-3 (the test area A-6, or the test area A-n) is adjusted, the temperature sensor 231-3 (the temperature sensors 231-6, or the temperature sensors 231-n) may respectively detect a first current temperature (a second current temperature, or a third current temperature) of the test area A-3 (the test area A-6, or the test area A-n). The variable temperature test platform 230 then respectively transmits the first current temperature, the second current temperature, and the third current temperature to the test devices 220-3, 220-6, and 220-n connected to the test areas A-3, A-6, and A-n. When the test device 220-3 (the test device 220-6, or the test device 220-n) receives the first current temperature (the second current temperature, or the third current temperature), the test device 220-3 (the test device 220-6, or the test device 220-n) may determine whether the first current temperature (the second current temperature, or the third current temperature) matches a first expected temperature (a second expected temperature, or a third expected temperature) of the first pending test (the second pending test, or the third pending test).

For example, if the first current temperature and the third current temperature respectively match the first expected temperature and the third expected temperature, the test device 220-3 and the test device 220-n may respectively conduct the first pending test and the third pending test on the component under test 250-3 and the component under test 250-n. Accordingly, the first pending test and the third pending test may be ensured to be conducted under the correct temperature environments to improve the accuracy of the tests. In addition, the variable temperature test system 200 may conduct tests on multiple components under test at the same time, which can effectively reduce the time required for testers to conduct tests and save the costs of test equipment.

On the other hand, if the second current temperature does not match the second expected temperature, the test device 220-6 may display the warning notification to remind the tester to check the temperature of the test environment again to improve the accuracy of the test.

Figure 3:
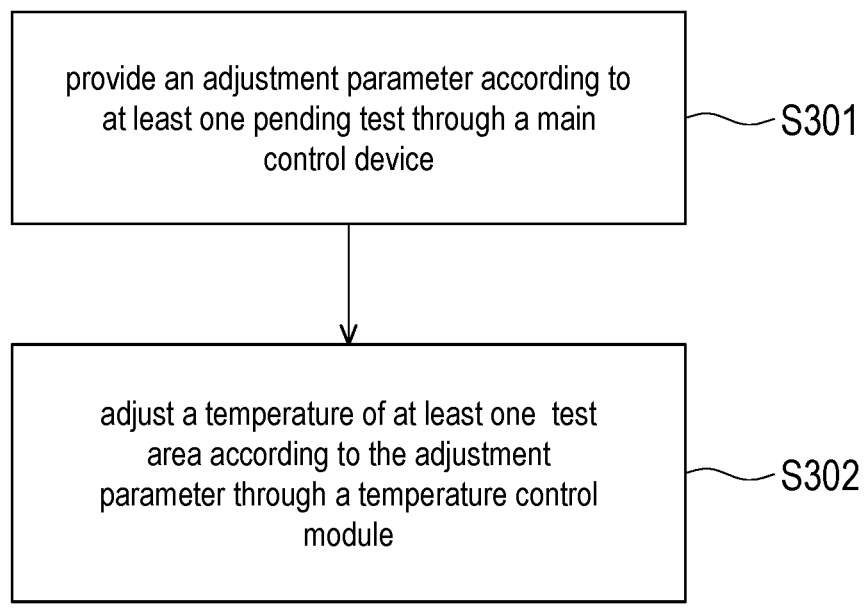
FIG. 3 is a flowchart of an operation method of a variable temperature test system according to an exemplary embodiment of the disclosure.

FIG. 3 is a flowchart of an operation method of a variable temperature test system according to an exemplary embodiment of the disclosure. The operation method of this exemplary embodiment may be conducted by the variable temperature test system 100 of FIG. 1.

Please refer to both FIG. 1 and FIG. 3. In step S301, the main control device 110 provides the adjustment parameter Pa according to at least one pending test. Next, in step S302, the temperature control module 132 adjusts the temperature of at least one test area according to the adjustment parameter Pa. The implementation details of the step S301 and the step S302 have been clearly explained in the foregoing exemplary embodiments, and therefore will not be repeated here.

To sum up, the variable temperature test system and the operation method thereof of the disclosure may adjust the temperature of the test area according to the adjustment parameter through the temperature control module, so that the test environment complies with the temperature changes in actual applications, thereby improving the accuracy of the test. In addition, the variable temperature test system of the disclosure may further provide multiple test environments with different temperatures, which can avoid the plug swap tests in the conventional technology, thereby reducing the loss of the component under test and improving the accuracy of the test. In addition, the variable temperature test system of the disclosure may further test multiple components under test at the same time, which can effectively reduce the time required for the tester to conduct tests and save the costs of the test equipment.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A variable temperature test system, comprising:
a main control device, used to provide an adjustment parameter according to at least one pending test;
a plurality of test devices; and
a variable temperature test platform, coupled to the main control device and the test devices, comprising:
 a plurality of test areas, respectively coupled to the test devices;
 a plurality of temperature sensors, respectively disposed in the test areas;
 a temperature control module, coupled to the test areas to adjust a temperature of at least one test area according to the adjustment parameter, wherein the adjustment parameter is used to indicate the at least one test area, at least one test temperature corresponding to the at least one test area, and at least one test time corresponding to the at least one test area.

2. The variable temperature test system according to claim 1, wherein in response to the temperature of the at least one test area being adjusted, at least one temperature sensor respectively detects at least one current temperature of the at least one test area, and the variable temperature test platform respectively transmits the at least one current temperature to at least one corresponding test device.

3. The variable temperature test system according to claim 2, wherein in response to receiving each of the at least one current temperature, each of the test devices determines whether each of the at least one current temperature matches an expected temperature of each of the at least one pending test, and
in response to each of the at least one current temperature matching the expected temperature, each of the test devices conducts each of the at least one pending test on a component under test placed in each of the corresponding test areas.

4. The variable temperature test system according to claim 3, wherein in response to each of the at least one current temperature not matching the expected temperature, each of the test devices displays a warning notification.

5. The variable temperature test system according to claim 1, further comprising:
a mobile device, used to receive a control signal from the main control device and move a component under test according to the control signal, wherein the component under test is a memory module.

6. The variable temperature test system according to claim 1, wherein the variable temperature test platform further comprises:
a heat insulation area, disposed between the test areas to insulate heat conduction between the test areas.

7. An operation method of a variable temperature test system, wherein the variable temperature test system comprises a main control device, a plurality of test devices, and a variable temperature test platform, wherein the variable temperature test platform comprises a plurality of test areas, a plurality of temperature sensors, and a temperature control module, the operation method comprising:
providing an adjustment parameter according to at least one pending test through the main control device; and
adjusting a temperature of at least one test area according to the adjustment parameter through the temperature control module, wherein the adjustment parameter is used to indicate the at least one test area, at least one test temperature corresponding to the at least one test area, and at least one test time corresponding to the at least one test area.

8. The operation method according to claim 7, further comprising:
respectively detecting at least one current temperature of the at least one test area through at least one temperature sensor in response to the temperature of the at least one test area being adjusted, and respectively transmitting the at least one current temperature to at least one corresponding test device through the variable temperature test platform.

9. The operation method according to claim 8, further comprising:
determining whether each of the at least one current temperature matches an expected temperature of each of the at least one pending test through each of the test devices in response to receiving each of the at least one current temperature,
conducting each of the at least one pending test on a component under test contacting a corresponding test area through each of the test devices in response to each of the at least one current temperature matching the expected temperature.

10. The operation method according to claim 9, further comprising:
displaying a warning notification through each of the test devices in response to each of the at least one current temperature not matching the expected temperature.

11. The operation method according to claim 7, wherein the variable temperature test system further comprises a mobile device, the operation method further comprising:
receiving a control signal from the main control device and moving a component under test according to the control signal through the mobile device, wherein the component under test is a memory module.

12. The operation method according to claim 7, wherein the variable temperature test platform further comprises a heat insulation area, the operation method further comprising:
   insulating heat conduction between the test areas though the heat insulation area.

* * * * *